June 16, 1931.  A. GERTH  1,810,043
TRACTION ATTACHMENT FOR VEHICLE WHEELS
Filed April 19, 1930
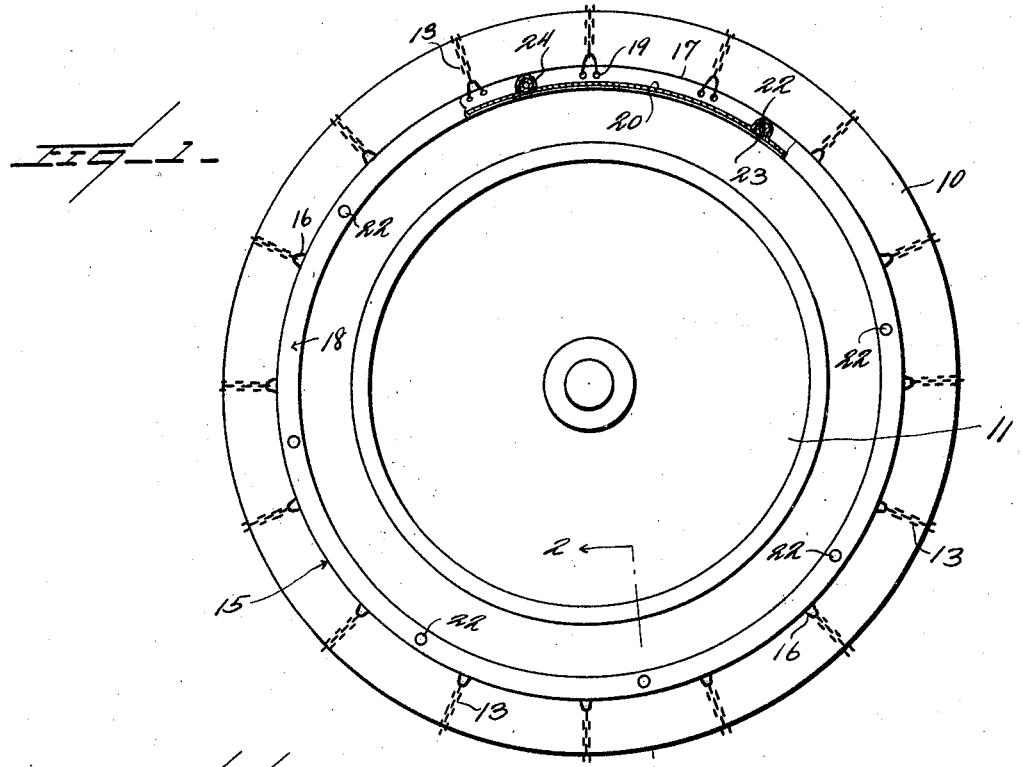
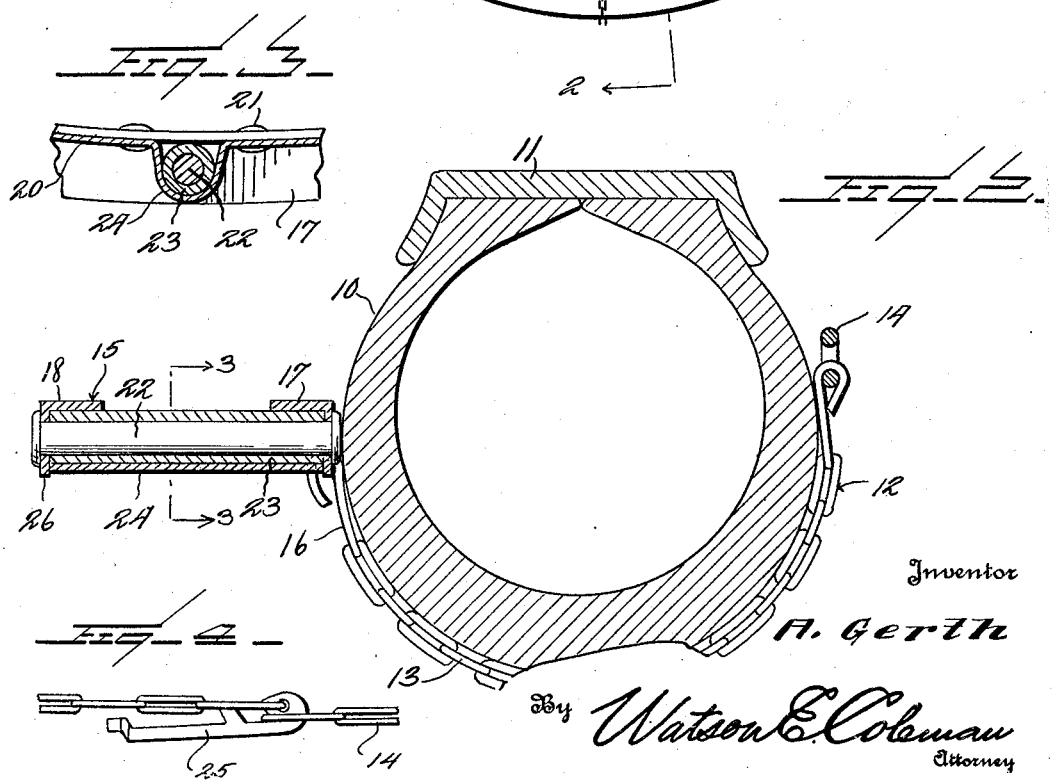

Patented June 16, 1931

1,810,043

UNITED STATES PATENT OFFICE

AUGUST GERTH, OF HIDEWOOD TOWNSHIP, DEUEL COUNTY, SOUTH DAKOTA

TRACTION ATTACHMENT FOR VEHICLE WHEELS

Application filed April 19, 1930. Serial No. 445,690.

The present invention relates to traction devices and has for an important object thereof the provision of a traction member which is adapted to be releasably attached to a motor vehicle wheel.

An object of this invention is to provide a traction member in combination with an anti-skid chain, the traction member being secured to the chain which may be releasably mounted on the vehicle wheel.

Another object of this invention is to provide a traction device which may be readily mounted or dismounted from the vehicle wheel and which, when in operative position, is adapted to prevent the wheel or tire from sinking into the snow or mud, the device providing a relatively broad surface so as to more readily support the weight of the vehicle on the soft ground or the like.

A further object of this invention is to provide a traction member which may be releasably secured to the wheel of the vehicle and which is so constructed as to be normally out of engagement with the ground where the vehicle is moving over ground which is relatively hard and able to support the weight of the vehicle by the tires.

The above and various other objects and advantages of this invention will in part be described in and in part be understood from the following detailed description of the present preferred embodiment, the same being illustrated in the accompanying drawings wherein:—

Figure 1 is a detail side elevation partly in section of a device constructed according to the preferred embodment of this invention;

Figure 2 is a sectional view taken on the line 2—2 of Figure 1;

Figure 3 is a sectional view taken on the line 3—3 of Figure 2; and

Figure 4 is a fragmentary detail elevation of one of the locking members for the chain sections.

Referring to the drawings wherein like numerals of reference designate corresponding parts throughout the several views, the numeral 10 designates generally a tire which is mounted on a wheel member 11 and the numeral 12 designates an anti-skid chain which is provided with a plurality of cross chains 13 and an inner side chain 14.

A traction member generally designated as 15 is secured to each of the cross chains 13 by means of hook members 16. The traction member 15 comprises an inner annular member 17 and an outer annular member 18, the inner member 17 being provided with a plurality of pairs of apertures 19 therein for receiving the hooks 16 of the cross chains. An annular band 20 of desired width is secured to each of the L shaped annular members 17 and 18 by means of rivets 21 or the like. A bolt or bar 22 is mounted in the annular members 17 and 18 and is positioned in spaced relation to the outer face of the cylindrical strap 20 and a tubular member 23 is mounted about the periphery of the bolt 22 and interposed between the inner faces of the L shaped members 17 and 18, so as to provide traction lugs.

The diameter of the traction member 15 is considerably smaller than the diameter of the tire 10 so that when the tire moves over ground of relatively hard surface, the traction member 15 will be positioned out of engagement with the ground. However, where the surface of the ground or road is relatively soft, as where mud or soft snow is encountered, the tire 10 will sink into the mud or snow and bring the traction member 15 into engagement with the surface so that the traction member 15 will cooperate with the tire 10 to support the vehicle on the soft surface.

If desired, the cylindrical member 20 may be bent or depressed at spaced points about the periphery thereof so as to engage about the periphery of the tubular member 23 as designated at 24 and more clearly shown in Figure 3. The inner side chain 14 is preferably split and the open ends thereof provided with a tensioning lock member 25 which is adapted to tension the side chain 14 and the cross chains 13 and coactively hold the traction member 15 concentrically of the wheel 11.

In the operation of this device, the anti-skid chain member 12 may be secured about the periphery of the tire in the conventional manner as by locking the securing member 25 on the inner side of the tire, and when the chain 12 is positioned on the periphery of the tire, the traction member 15 will be held concentrically of the tire and be positioned in outstanding relation thereto, the inner annular member 17 being adapted to frictionally engage against the outer side of the tire. When the vehicle is moving forwardly over a relatively soft surface the tire 10 will sink thereinto and bring the traction member into contact with the surface, the outer surface of the cylindrical supporting member 20 contacting with the soft surface and cooperating with the tire so as to support the vehicle on the surface of the ground or road.

The raised portions 24 of the supporting member 20 will provide a gripping portion for the supporting member 20 so that the wheel will not spin or slide on the smooth surface. The L shaped side members 17 and 18 will also prevent side slipping of the vehicle in the soft surface, the vertically disposed leg 26 of the L shaped member 18 being adapted to extend into the soft surface and tend to prevent lateral movement of the wheel in the soft surface.

It will, of course, be understood that various changes and modifications may be made in the details of construction and design of the above specifically described embodiment of this invention without departing from the spirit thereof, such changes and modifications being restricted only by the scope of the following claims.

What is claimed is:—

1. A traction device of the character described comprising in combination with an anti-skid chain, a cylindrical member, a pair of L shaped side members secured to the opposite ends of said cylindrical member, one of said side members having a plurality of spaced apertures therethrough adapted for engagement with the cross chains of the anti-skid chain, said cylindrical member having a plurality of raised portions in the periphery thereof and means extending transversely of said cylindrical member and engaging said side members for maintaining one leg of said side members in vertical position.

2. A traction device of the character described comprising in combination with an anti-skid chain having a plurality of spaced cross chains, a cylindrical member, a pair of L shaped side members secured to the opposite ends of said cylindrical member, a plurality of bolts secured to said side members and extending transversely of said cylindrical member, said cylindrical member having outstanding portions in the periphery thereof exteriorly of said bolts whereby to provide traction lugs in the periphery of said cylindrical member said bolts reinforcing said outstanding portions and coactively maintaining the vertically disposed portions of said side members in vertical position.

In testimony whereof I hereunto affix my signature.

AUGUST GERTH.